United States Patent
Davis et al.

(10) Patent No.: US 10,244,428 B2
(45) Date of Patent: *Mar. 26, 2019

(54) METHOD FOR INSERTING AND REMOVING PADDING FROM PACKETS

(71) Applicant: Synopsys, Inc., Mountain View, CA (US)

(72) Inventors: Stephen Davis, Ottawa (CA); Michael Borza, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 391 days.

This patent is subject to a terminal disclaimer.

(21) Appl. No.: 14/846,670

(22) Filed: Sep. 4, 2015

(65) Prior Publication Data
US 2015/0382238 A1   Dec. 31, 2015

Related U.S. Application Data (63) Continuation of application No. 13/958,041, filed on Aug. 2, 2013, now Pat. No. 9,130,800, which is a continuation of application No. 11/497,418, filed on Aug. 2, 2006, now Pat. No. 8,514,894.

(60) Provisional application No. 60/704,459, filed on Aug. 2, 2005.

(51) Int. Cl.
| | |
|---|---|
| *H04J 3/07* | (2006.01) |
| *H04W 28/06* | (2009.01) |
| *H04W 52/02* | (2009.01) |
| *H04L 29/06* | (2006.01) |
| *H04L 12/413* | (2006.01) |

(52) U.S. Cl.
CPC .......... *H04W 28/06* (2013.01); *H04L 12/413* (2013.01); *H04L 29/06959* (2013.01); *H04L 63/0485* (2013.01); *H04W 52/0229* (2013.01); *H04L 63/164* (2013.01); *Y02D 70/00* (2018.01)

(58) Field of Classification Search
CPC .............. H04W 28/06; H04W 52/0229; H04L 12/413; H04L 29/06959; H04L 63/0485; H04L 63/164
See application file for complete search history.

(56) References Cited

U.S. PATENT DOCUMENTS

| | | | | |
|---|---|---|---|---|
| 5,444,782 | A * | 8/1995 | Adams, Jr. .............. | H04L 29/06 713/153 |
| 6,522,694 | B1 * | 2/2003 | Ryan ...................... | H04N 19/00 375/240.25 |
| 8,514,894 | B2 * | 8/2013 | Davis .................... | H04W 28/06 370/505 |

(Continued)

*Primary Examiner* — Maharishi V Khirodhar
(74) *Attorney, Agent, or Firm* — Jaquez Land Greenhaus LLP; Bruce W. Greenhaus, Esq.

(57) ABSTRACT

The invention relates to the field of data packet management, and more specifically to the field of managing of data packets in such a manner that power consumption is reduced, such reduction being especially beneficial for portable device applications. In accordance with an embodiment of the invention there is provided a method of handling and manipulating data wherein padding and unpadding operations for a packet of data are performed at the transmission/reception of a packet from a network, and data handling is minimized within the portable device. According to another embodiment of the invention there is provided a method of encryption for packet data absent the padding data.

8 Claims, 8 Drawing Sheets

(56) References Cited

U.S. PATENT DOCUMENTS

| | | | |
|---|---|---|---|
| 9,130,800 B2* | 9/2015 | Davis | H04W 28/06 |
| 2002/0188871 A1* | 12/2002 | Noehring | H04L 29/06 |
| | | | 726/13 |
| 2004/0107170 A1* | 6/2004 | Labrou | G06Q 20/02 |
| | | | 705/64 |
| 2004/0151182 A1* | 8/2004 | Kokubo | H04L 63/0485 |
| | | | 370/395.1 |
| 2004/0252705 A1* | 12/2004 | Zancan | H04L 12/40013 |
| | | | 370/401 |
| 2006/0002416 A1* | 1/2006 | Yagihashi | H04L 1/1835 |
| | | | 370/428 |
| 2006/0075135 A1* | 4/2006 | Rambhia | H04L 9/36 |
| | | | 709/238 |
| 2007/0022206 A1* | 1/2007 | Pope | H04L 47/10 |
| | | | 709/231 |
| 2007/0076680 A1* | 4/2007 | Amram | H04L 1/0083 |
| | | | 370/349 |

* cited by examiner

METHOD FOR INSERTING AND REMOVING PADDING FROM PACKETS

CROSS REFERENCE TO RELATED APPLICATIONS

This application is a continuation application of application Ser. No. 13/958,041, filed Aug. 2, 2013, entitled "Method for Inserting/Removal Padding from Packets", issued as U.S. Pat. No. 9,130,800, the disclosure of which is incorporated herein by reference in its entirety, which is a continuation application of application Ser. No. 11/497,418 filed on Aug. 2, 2006, entitled "Method for Inserting/Removal Padding from Packets", issued as U.S. Pat. No. 8,514,894. Application Ser. No. 11/497,418 claims the benefit of U.S. Provisional Application No. 60/704,459, filed Aug. 2, 2005, which is hereby incorporated by reference herein in its entirety.

FIELD OF THE INVENTION

The invention relates to the field of data packet management and more specifically to the field of managing of data packets in such a manner that power consumption is reduced.

BACKGROUND OF THE INVENTION

Currently, there exists a standard for transmitting datagrams over Ethernet networks. The basic unit of data transmission over an Ethernet network is a frame wherein the Ethernet frame defines the data layout at the OSI Layer 2 link level. Ethernet has a minimum packet size because the transmission of a packet at the source node without hearing a collision is assumed to be an acknowledgement of the transmission and no collisions are assumed until the source has heard the end of packet transmission.

The length of an Ethernet frame is typically no less than 64 bytes or 512 bits and no more than 1518 bytes. The 64 bytes consist of two 6-byte addresses, 2-bytes of type, 4-bytes CRC, and 46 bytes of data. The exception to the minimum length is the Gigabit Ethernet standard where the minimum packet size is increased to 512 bytes.

A runt packet is then considered as a packet that is smaller than the minimum Ethernet frame size of 64 bytes excluding the preamble. This minimum size is tied to the maximum propagation time of an Ethernet network segment (51.2 microseconds) and it takes approximately 51.2 microseconds to transmit 64 bytes of data. Therefore, every node on the segment is aware that another node is transmitting before the transmission is complete, providing for more accurate collision detection. Typically, if the host has less than 46 bytes of data to send, the host pads bytes to make the data into 46 bytes.

This operation is typically done at the processor or microcontroller in communication with the Ethernet controller.

Furthermore, in some cases, other padding is done to ensure security of the packet over the network. For example, this padding is done to conceal the actual length of the payload or the header.

In wireless communication, it is desired to transmit as few bytes as possible and, therefore, padding is typically undesirable. That said, it must be employed, where necessary, to meet a standard, such as the Ethernet standard. This results in padding and unpadding operations that are wasteful of processing time and, for portable devices, battery power.

SUMMARY OF THE INVENTION

In accordance with the invention there is provided a method of removing padding from a packet comprising: receiving a packet from a network at a receiver, the packet comprising padding data; storing a portion of the data packet including other than padding data within a memory; and, other than storing a portion of the data packet comprising padding data within the memory.

In accordance with the invention there is provided a method of inserting padding within a packet comprising: receiving a packet from a memory, the packet absent padding data; transmitting the packet via a network; and, automatically inserting padding data within the packet during transmission thereof.

In accordance with the invention there is also provided a method of encrypting a packet using a cryptographic engine comprising: receiving data, the packet comprising padding data; performing a cipher operation on the data including one of discarding padding data within data that is decrypted during the ciphering and adding padding data to the data prior to encryption thereof during the ciphering, the padding data other than stored within memory with the data in a plain text form.

BRIEF DESCRIPTION OF THE DRAWINGS

Exemplary embodiments of the invention will now be described in conjunction with the following drawings, in which.

DETAILED DESCRIPTION THE INVENTION

Figure 1:
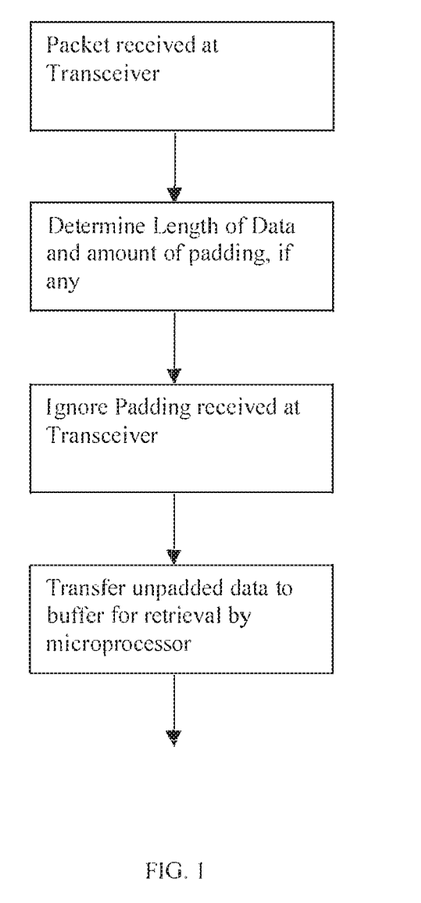
FIG. 1 illustrates a data packet processing system in accordance with a first embodiment of the invention.

FIG. 1 illustrates a method according to the invention for processing of an Ethernet frame. An Ethernet frame comprises a preamble used for synchronization; a start frame delimiter marking the start of a frame; a destination field showing the MAC address of the network node to which the frame is addressed; a source field showing the MAC address of the transmitting node; a length/type field indicating the number of bytes to follow in the data field; a data field containing the information being sent across the network; a Pad field used to lengthen the data field; and, a frame check sequence field to test for errors.

In order to detect collision across a network according to CSMA/CD, a minimum packet size of 64 bytes is set for an Ethernet frame wherein 46 bytes comprise the data. In the case where the data field is less than 46 bytes long, then the Pad field is filled with a zero-octet pattern. Typically, a collision occurs when two nodes attempt to transmit at the same time. A transmitting node is generally required to transmit the minimum packet size and detect whether collision has occurred. For 10 Mbps and 100 Mbps Ethernet, the slot time is 512 bit times, which is also the minimum length of an Ethernet packet. As such, any frame received by a node that is less than 64 bytes in length is automatically assumed to be a fragment from a collision and is discarded.

Typically, the microprocessor determines an amount of padding and performs the insertion and removal of padding for an Ethernet packet. The data packet including padding is then provided to a transceiver for transmission to the Ethernet network.

In wireless applications, reducing power consumption is extremely important resulting in a longer battery life and improving performance. This is possible through limiting an amount of data transmitted when possible. A further method for reducing power consumption in battery powered wireless devices is to limit processor operations and other power consuming operations. Each data transfer and each storage operation is known to consume power and is, therefore, beneficial only when necessary.

FIG. 1 shows a simplified flow diagram of a method for receiving a frame including padding according to one embodiment of the invention. A packet is received at a transceiver. The transceiver includes a receiver of an Ethernet controller. Within the transceiver is a counter. When a received data packet includes padding therein, the data is received but only the data absent the padding bits is stored in a memory buffer. The memory buffer is for storing the data for later retrieval by a microprocessor. For example, the transceiver includes a counter for counting the number of bits until the start of padding. Once the counter has completed counting, the remainder of the packet data is discarded as it comprises only padding. Thus, the padding bytes are not processed, moved or stored within the data buffer or retrieved therefrom by the microprocessor. This saves power consumption that would be necessary to move the padding bits throughout the circuit.

Figure 2:
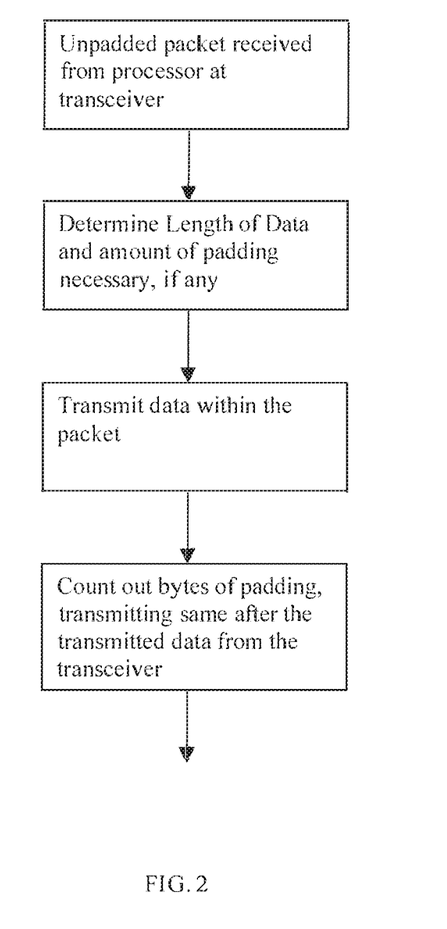
FIG. 2 illustrates operating steps according to the second embodiment of the invention for removal/insertion of padding of a packet.

Referring to FIG. 2, a simplified flow diagram of a method for padding a frame according to one embodiment of the invention is shown. An unpadded packet is received from a processor at a transceiver. The transceiver includes a transmitter for transmitting data, the data in the form of an Ethernet packet. Within the transceiver is a counter. When a received data packet absent padding therein but requiring padding is received from the processor, the amount of padding necessary is determined. The transmitter then transmits the data within the data packet and inserts padding bits as necessary during transmission thereof. Thus, the padding bytes need not be transferred from the processor to the transceiver. Though the term determined is used with relation to finding an amount of padding, it is a simple matter to have a counter counting down transmitted bits and when greater than zero, continuing the transmission with padding bits until the counter reaches zero.

For example, when the data packet is transferred from the processor via a memory buffer, the data packet is stored within the memory buffer. The memory buffer is for storing the data for retrieval by the transceiver and for transmission therefrom. Thus the padding bits are not stored by the processor in the memory buffer and need not be retrieved by the transceiver, thereby reducing power consumption over circuits that require the transfer of the padding bits.

Figure 3:
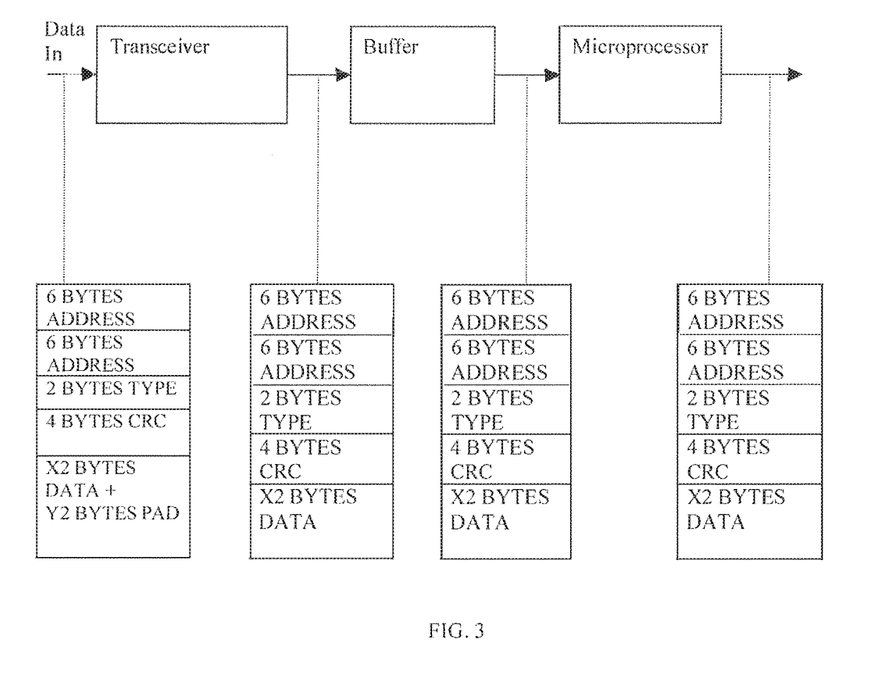
FIG. 3 shows a simplified data flow diagram showing a packet including padding received by the Ethernet controller.

In FIG. 3 a data flow diagram showing a packet including padding received by the Ethernet controller is shown. If the amount of data X2 within the packet is below 46 bytes then the packet includes padding therein of Y2 bytes such that X2+Y2=46 bytes. The transceiver then ignores the padding bytes Y2 such that only the data bytes X2 absent the padding bytes are stored in the memory buffer. The data bytes X2 absent the padding bytes Y2 are retrieved from the buffer by the microprocessor. By reducing the number of bytes stored in the memory buffer from X2+Y2 to X2, the number of bytes retrieved from the memory buffer and processed is reduced thereby decreasing memory access operations by 2(Y2)—one store and one retrieve per padding byte—and decreasing power consumption for the data receive operation.

Figure 4:
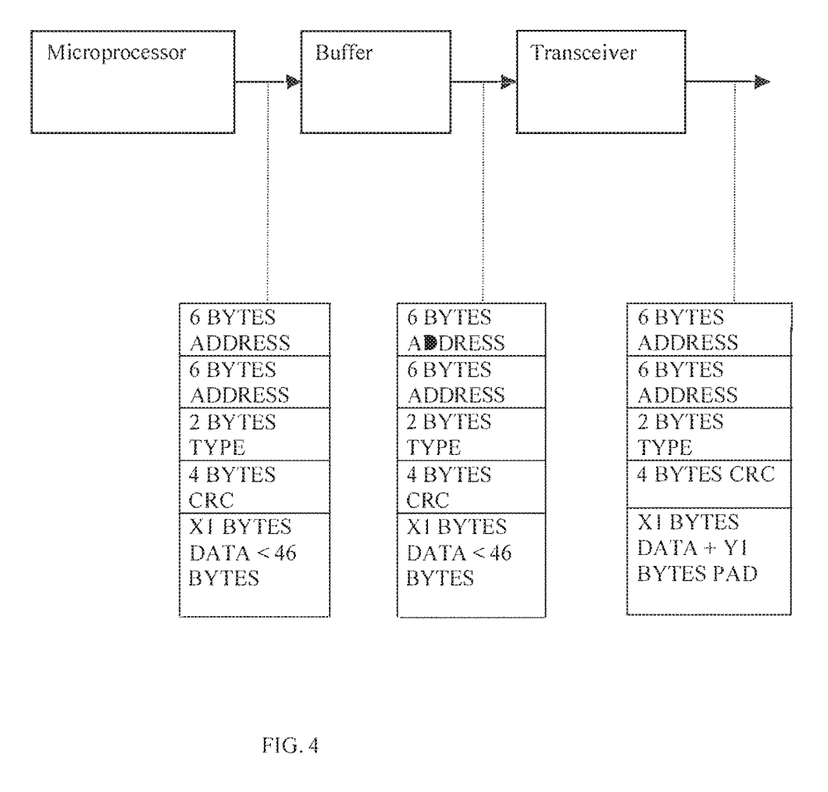
FIG. 4 illustrates a simplified data flow path diagram showing a data packet absent padding bytes for transmission from a transceiver.

FIG. 4 illustrates a data flow path diagram showing a data packet absent padding bytes for transmission from a transceiver. For example, if a packet with X1 bytes of data being less than 46 bytes is to be transmitted, the microprocessor loads the X1 bytes into the buffer to be retrieved by the transceiver of an Ethernet controller. The transceiver transmits the retrieved bytes and then, during transmission, adds Y1 padding bytes such that the data comprises 46 bytes. In this manner, the transceiver only retrieves X1 bytes from the buffer and generates the further Y1 bytes for transmission therefrom. The resulting operation requires Y1 fewer store operations and Y1 fewer retrieve operations thereby reducing power consumption.

Figure 5:
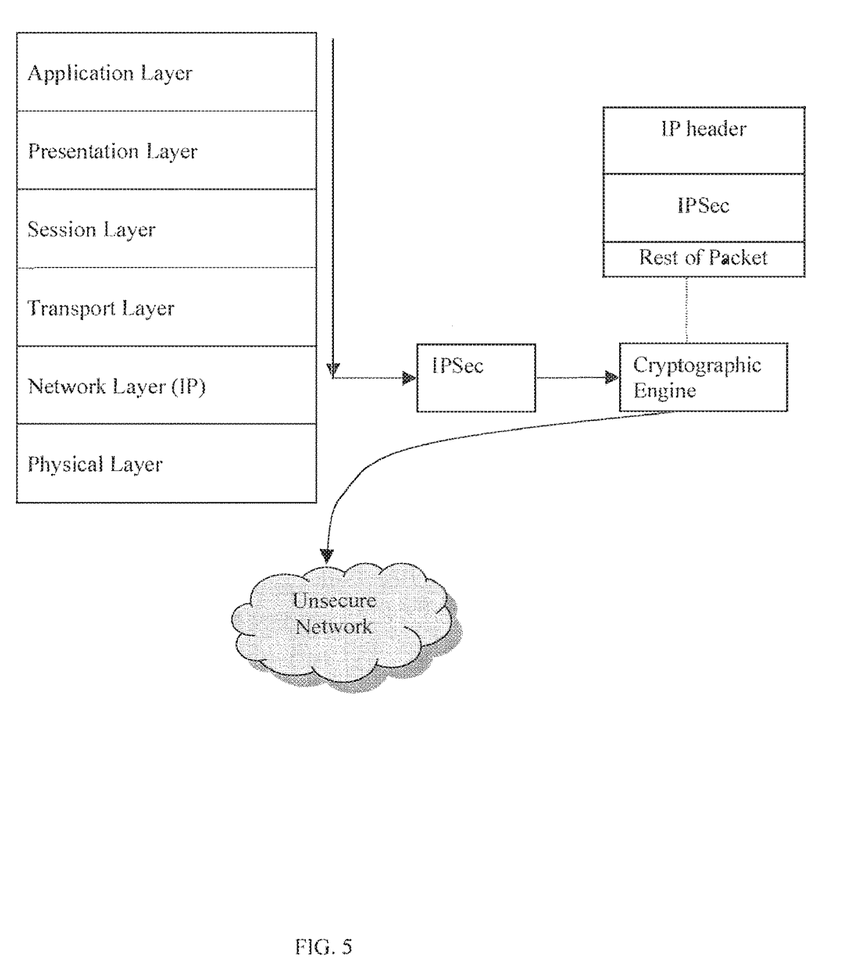
FIG. 5 illustrates data flow for a method for transmitting a packet using IPSec protocols according to a second embodiment of the present invention.

FIG. 5 illustrates a method for transmitting a packet using IPSec protocols according to a second embodiment of the present invention. As shown, a packet is transmitted from the transport layer to the Network (IP) layer. Typically, this framework includes an authentication header (AH) and encryption service payload (ESP) where the combination provides privacy, integrity and authentication for IP. Typically data that is encrypted is referred to encrypted data, data that is decrypted refers to decrypted data, data that is unsecured is referred to as plain text data, and ciphering is used as a term to denote both encryption and decryption processes.

The ESP payload handles encryption of the IP data and the payload data is of variable length as the ESP also contains 0 bytes to 255 bytes of padding to ensure the data will be of the correct length for particular types of encryption processes. ESP typically puts information both before and after a protected data. In the present embodiment of the invention, the cryptographic engine connected to the transceiver of the Ethernet controller handles the encryption and the padding. For encryption, the data, the padding and the padding length and the next header are encrypted. The packet then adds a new IP header thereby wrapping the IP packet in another IP packet. In this manner the packet remains secure upon transmission and is not easily analyzable by a third-party.

Figure 6:
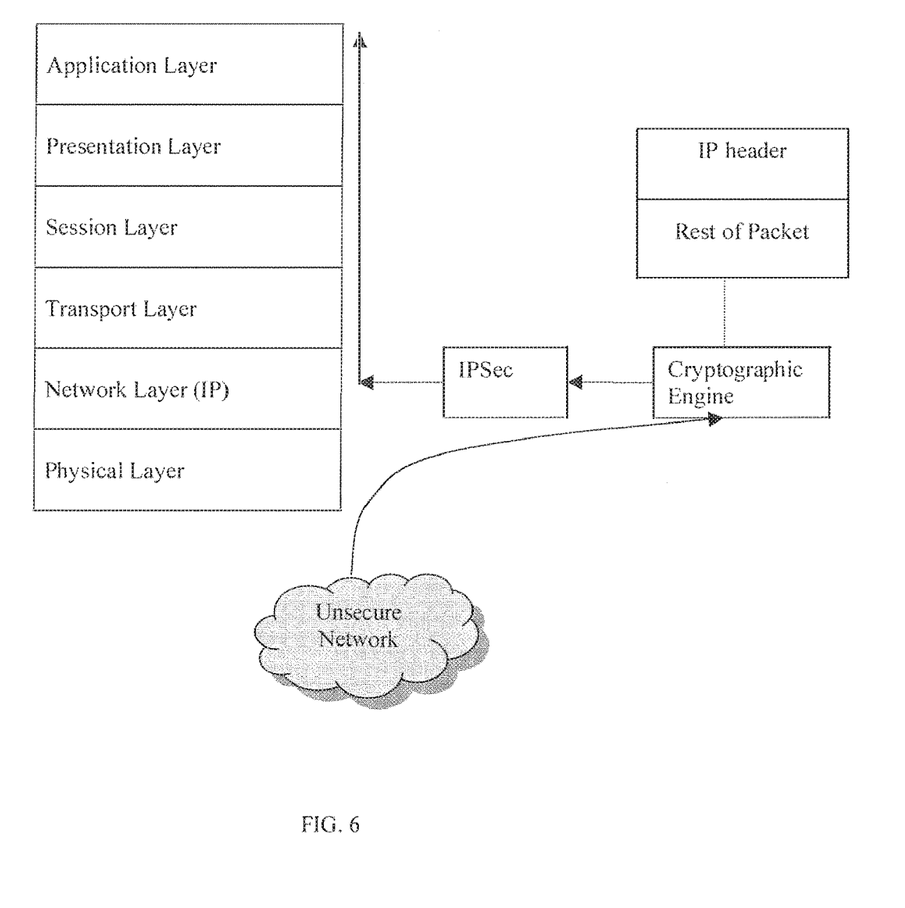
FIG. 6 illustrates data flow for a method for receiving a packet using IPSec protocols wherein the cryptographic engine connected to the receiver of an Ethernet controller decrypts the packet, removes its padding and the new IP header and passes the unpadded data to the transport layer.

Alternatively, FIG. 6 shows that upon receiving a packet encrypted using IPSec protocols, the cryptographic engine connected to the receiver of an Ethernet controller decrypts the packet, removes its padding and the new IP header and passes the unpadded data to the transport layer. Typically, this removal of padding is performed at the microprocessor, thereby requiring a larger than necessary data transfer to and from a memory buffer. By performing the padding and removal of padding within the cryptographic engine, the power required for data transfer is reduced while maintaining functionality.

Figure 7:
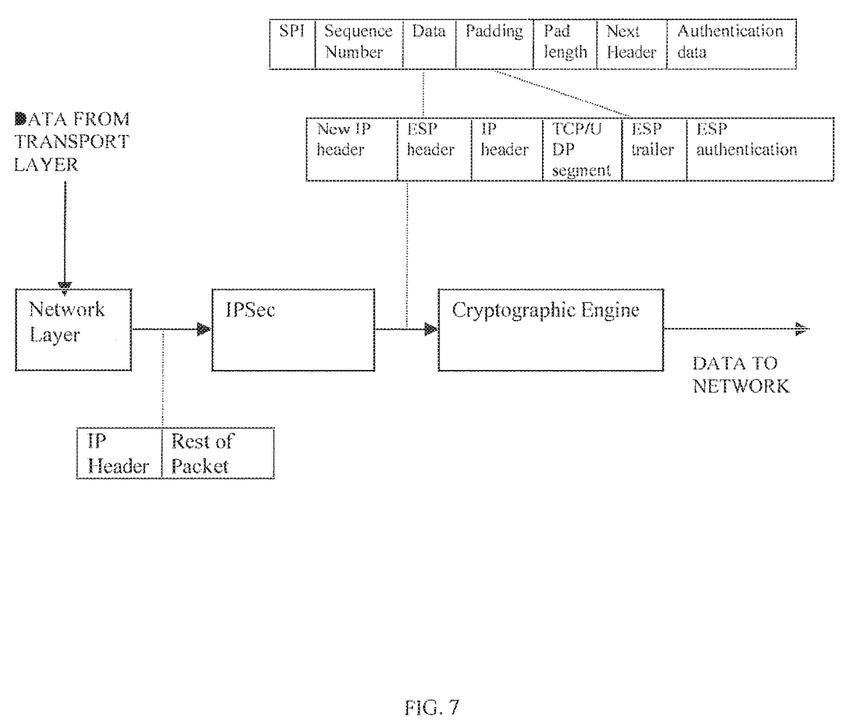
FIG. 7 shows a simplified data flow diagram for transmitting a packet using IPSec protocols; and, FIG. 8 shows a simplified data flow diagram of a method for receiving an encrypted padded packet according to IPSec protocols.

Referring to FIG. 7, a data flow diagram for transmitting a packet using IPSec protocols is shown. The packet is received from the transport layer comprising an IP header and the rest of the packet passed from the transport layer. A cryptographic engine determines a padding length in accordance with a selected encryption algorithm. The padding is then inserted within the data during encryption such that the padding data need not be transferred numerous times to and from memory, thereby saving power. The encrypted data packet including padding bytes therein is then passed along the network such that the length of the original IP packet and its contents are not easily determinable without a cryptographic engine supporting a same encryption standard and having security information necessary for decrypting the encrypted data packet.

Figure 8:
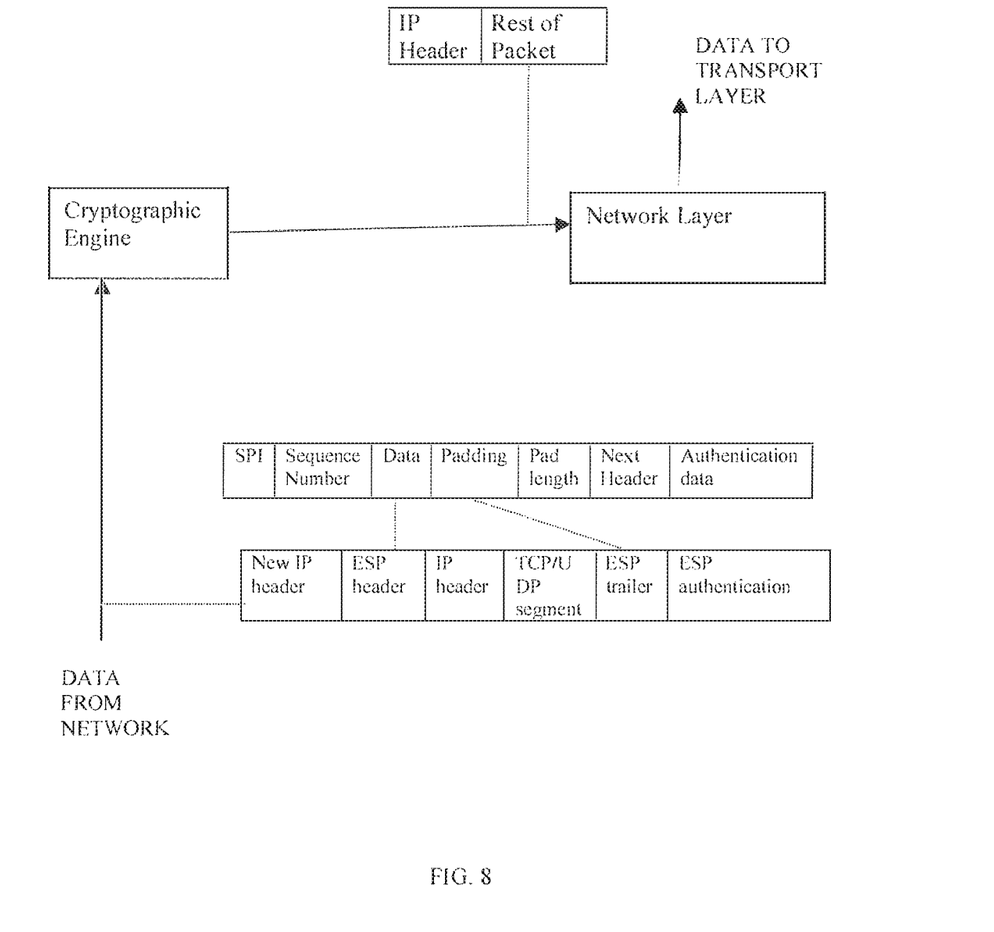

Referring to FIG. 8, a data flow diagram of a method for receiving an encrypted padded packet according to IPSec protocols is illustrated. The received packet containing an ESP payload and variable padding is received by a cryptographic engine having security data available thereto for use in accessing data secured within the encrypted data packet. The cryptographic engine decrypts data within the packet and stores the data absent padding data within a memory buffer for being accessed by a processor. Thus, padding bytes within the decrypted data are not transferred to the processor thereof, thereby saving power for the overall operation.

Advantageously, the embodiments described above operate within existing standards to provide improved power performance for portable and battery operated devices. Though the invention is described with reference to transceivers, it is equally applicable to receivers, transmitters, and to cryptographic engines.

Numerous other embodiments may be envisaged without departing from the spirit or scope of the invention.

We claim:

1. A communication device comprising:
   a) a port to receive a packet that had been transmitted with padding, the packet having comprised a plurality of data bits and a plurality of padding bits transmitted over a network; and
   b) a counter to count the data bits received from the network and to determine when to cease receiving further bits based on the counter indicating that all data bits have been received;
   c) buffer; and
   d) a cryptographic engine, coupled to the port, counter and buffer, to process the data bits and store the received data bits in the buffer.

2. The communication device of claim 1, wherein the cryptographic engine performs a ciphering operation on the data stored in the buffer.

3. The communication device of claim 2, wherein the ciphering operation creates ciphered data and the cryptographic engine adds padding bits to the ciphered data and wherein the ciphered data and the padded bits are transmitted into the network.

4. The communication device of claim 1, wherein the communication device is a wireless communication device.

5. The communication device of claim 1, wherein the packet is an Ethernet packet.

6. The communication device of claim 1, wherein the communication device is a battery powered device.

7. A wireless communication device comprising:
   a. a receiver receiving a packet that had been transmitted with data bits and padding bits, the receiver counting the data bits and ceasing to receive further bits, including the padding bits, upon having received all of the data bits and storing the received data bits; and
   b. a memory coupled to the receiver, the memory storing the data bits absent the padding bits.

8. The wireless communication device of claim 7, wherein the received packet is an encrypted packet, the wireless communication device further comprising;
   a. a cryptographic engine coupled to the memory and decrypting the packet and storing in the memory, the data bits absent the padding bits.

* * * * *